(12) United States Patent
Saito

(10) Patent No.: US 8,860,373 B2
(45) Date of Patent: Oct. 14, 2014

(54) PROTECTIVE CIRCUIT AND CHARGING DEVICE

(75) Inventor: Keisuke Saito, Fukushima (JP)

(73) Assignee: Sony Corporation, Tokyo (JP)

( * ) Notice: Subject to any disclaimer, the term of this patent is extended or adjusted under 35 U.S.C. 154(b) by 306 days.

(21) Appl. No.: 13/325,996

(22) Filed: Dec. 14, 2011

(65) Prior Publication Data

US 2012/0161712 A1 Jun. 28, 2012

(30) Foreign Application Priority Data

Dec. 27, 2010 (JP) ................ 2010-290584

(51) Int. Cl.
| | |
|---|---|
| *H02J 7/00* | (2006.01) |
| *H02H 5/04* | (2006.01) |
| *H02H 3/087* | (2006.01) |
| *H02H 3/20* | (2006.01) |

(52) U.S. Cl.
CPC ............... *H02J 7/0031* (2013.01); *H02H 5/04* (2013.01); *H02H 5/041* (2013.01); *H02J 2007/004* (2013.01); *H02J 2007/0037* (2013.01); *H02H 3/087* (2013.01); *H02H 3/202* (2013.01)
USPC .............................. 320/129; 320/134; 361/92

(58) Field of Classification Search
CPC ...................................................... H02J 7/0093
USPC ............ 320/129, 134, 136, 127, 115; 361/92; 340/636.1, 636.21; 324/426
See application file for complete search history.

(56) References Cited

U.S. PATENT DOCUMENTS

| | | | | |
|---|---|---|---|---|
| 6,127,808 | A * | 10/2000 | Sudo et al. | 320/134 |
| 6,208,117 | B1 * | 3/2001 | Hibi | 320/134 |
| 6,246,214 | B1 * | 6/2001 | Oglesbee | 320/136 |
| 6,329,796 | B1 * | 12/2001 | Popescu | 320/134 |
| 7,276,881 | B2 * | 10/2007 | Okumura et al. | 320/134 |

FOREIGN PATENT DOCUMENTS

JP 2007-028802 2/2007

* cited by examiner

*Primary Examiner* — Yalkew Fantu
(74) *Attorney, Agent, or Firm* — K&L Gates LLP

(57) ABSTRACT

A protective circuit includes a smoothing circuit in which a pulse-like charging output permitting signal is input in a normal charging state and the pulse-like charging output permitting signal is not input in an abnormal charging state, and a charging output control element that is controlled so as to permit or stop a charging output with respect to an electric storage device, permits the charging output by an output signal in which the charging output permitting signal is smoothened by the smoothing circuit, and stops the charging output when an abnormal charging state is detected.

14 Claims, 10 Drawing Sheets

US 8,860,373 B2

PROTECTIVE CIRCUIT AND CHARGING DEVICE

CROSS REFERENCES TO RELATED APPLICATIONS

The present application claims priority to Japanese Priority Patent Application JP 2010-290584 filed in the Japan Patent Office on Dec. 27, 2010, the entire content of which is hereby incorporated by reference.

BACKGROUND

The present disclosure relates to, for example, a protective circuit and a charging device including the protective circuit in regard to charging and discharging of a secondary battery.

As a charging device with respect to a secondary battery, for example, a lithium ion secondary battery, a charging device in which charging output is prohibited when charging voltage is excessive is suggested. For example, in Japanese Unexamined Patent Application Publication No. 2007-28802, the following is described. That is, if it is detected that a battery voltage reaches a predetermined overcharging protective voltage, a charging control transistor is turned off. In addition, in Japanese Unexamined Patent Application Publication No. 2007-28802, when charging voltage is decreased to charging restarting voltage, the charging control transistor is turned on.

An example of a protective circuit in the related art is illustrated in FIG. 10. When a P-channel type field effect transistor (hereinafter, appropriately referred to as "FET") Q12 is turned on, charging power is supplied to a secondary battery BT. A charging control portion 21 observes charging voltage between the FET Q12 and the secondary battery BT via resistance, and compares the charging voltage and a preset threshold value (overcharging protective voltage). According to the comparison result, a charging output permitting signal is output from the charging control portion 21. For example, the charging control portion 21 includes a microcomputer.

When the charging voltage is smaller than the threshold value, it is determined to be a normal charging state. Thus, a high level of charging output permitting signal is output from the charging control portion 21. An N-channel type FET Q11 is turned on by the charging output permitting signal. A drain of the FET Q11 is connected to a gate of the FET Q12, due to the fact that the FET Q11 is turned on, the FET Q12 is turned on, the charging power is supplied to the battery BT, and the battery BT is charged.

On the other hand, when the charging voltage is the threshold value or more, it is determined to be an abnormal charging state, and the charging control portion 21 outputs a low level of charging output stopping signal. Thereby, the FET Q11 is turned off and the FET Q12 is turned off. As a result, the charging power is not supplied to the battery BT and the charging is stopped.

FIG. 11 illustrates another example of the charging control circuit in the related art. Similarly to the configuration of FIG. 10, the charging control portion 21 observes charging voltage, when the charging voltage is smaller than the threshold value, it is determined to be a normal charging state, and a high level of charging output permitting signal is output from the charging control portion 21. The FET Q11 and the FET Q12 are turned on by the charging output permitting signal.

In addition, a protective IC (Integrated Circuit) 22 is installed, and the charging voltage is observed by the protective IC 22. If the charging voltage is the threshold value or more, the protective IC 22 outputs a high level of charging stopping signal. The charging stopping signal is supplied to a gate of an N-channel type FET Q13, and the FET Q13 is turned on. Since a drain of the FET Q13 is connected to the gate of the FET Q11 and the source is connected to ground (a negative electrode of the battery BT), if the FET Q13 is turned on, the FET Q11 is turned off. Therefore, the FET Q12 is turned off and the charging is stopped.

SUMMARY

In the protective circuit illustrated in FIG. 10, if the charging control portion 21 fails and failure in which the charging output permitting signal usually becomes a high level occurs, the charging does not stop, and there is a problem in that overcharging may not be prevented. In addition, even when program of the microcomputer which constitutes the charging control portion 21 is congested and the charging output permitting signal usually becomes a high level, similarly, the overcharging may not be obstructed. In the case where the charging output permitting signal is a low level and also in the case where charging is permitted, there are similar concerns.

As illustrated in FIG. 11, in the configuration in which the protective IC 22 that observes the charge voltage and generates the charging stopping signal is installed separated to the charging control portion 21, even when failure of the charging control portion 21 and run away of the program occur, the charging can be stopped. However, since it is necessary to add the protective IC 22, cost is increased and the configuration is complicated. In addition, when the protective IC 22 fails and usually outputs a low level of charging stopping signal, the charging may be difficult to stop.

The above-described problems are not limited to the charging control, and may be similarly generated in a discharging control for preventing abnormal discharging such as over-discharging.

Therefore, it is desirable to provide a protective circuit and a charging device capable of reliably stopping charging or discharging even when failure of a control portion or a protective IC, or run away of the program of the control portion occurs.

According to an embodiment of the present disclosure, there is provided a protective circuit including a smoothing circuit in which a pulse-like charging output permitting signal is input in a normal charging state and the pulse-like charging output permitting signal is not input in an abnormal charging state, and a charging output control element that is controlled so as to permit or stop a charging output with respect to an electric storage device, permits the charging output by an output signal in which the charging output permitting signal is smoothened by the smoothing circuit, and stops the charging output when an abnormal charging state is detected.

In an embodiment of the present disclosure, the smoothing circuit may include a first input terminal and a second input terminal to which the pulse-like charging output permitting signal is input, a first output terminal and a second output terminal that output a control signal to the charging output control element, a series circuit that includes a first condenser and a first diode in forward direction which are inserted between the first input terminal and the first output terminal, a second diode in which an anode is connected to a power supply line which connects the second input terminal and the second output terminal and a cathode is connected between the first condenser and an anode of the first diode, and a second condenser that is inserted between the power supply line and a cathode of the first diode.

According to another embodiment of the present disclosure, there is provided a protective circuit including a smoothing circuit in which a pulse-like discharging output permitting signal is input in a normal discharging state and the pulse-like discharging output permitting signal is not input in an abnormal discharging state, and a discharging output control element that is controlled so as to permit or stop a discharging output from an electric storage device to a load, permits the discharging output by an output signal in which the discharging output permitting signal is smoothened by the smoothing circuit, and stops the discharging output when an abnormal discharging state is detected.

In an embodiment of the present disclosure, the smoothing circuit may include a first input terminal and a second input terminal to which the pulse-like discharging output permitting signal is input, a first output terminal and a second output terminal that output a control signal to the discharging output control element, a series circuit that includes a first condenser and a first diode in forward direction which are inserted between the first input terminal and the first output terminal, a second diode in which an anode is connected to a power supply line which connects the second input terminal and the second output terminal and a cathode is connected between the first condenser and an anode of the first diode, and a second condenser that is inserted between the power supply line and a cathode of the first diode.

According to still another embodiment of the present disclosure, there is provided a charging device including a power supply circuit that generates a charging power supply, a charging output control element that controls permitting or stopping of output of the charging power supply, a charging control portion that detects a charging state, outputs a pulse-like output permitting signal when a charging state is normal, and does not output the output permitting signal when a charging state is abnormal, and a control signal generating portion that is connected to the charging control portion and outputs a control signal from the output permitting signal to the charging output control element.

In an embodiment of the present disclosure, the control signal generating portion may include a first input terminal and a second input terminal to which the pulse-like output permitting signal is input, a first output terminal and a second output terminal that output the control signal to the charging output control element, a series circuit that includes a first condenser and a first diode in forward direction which are inserted between the first input terminal and the first output terminal, a second diode in which an anode is connected to a power supply line which connects the second input terminal and the second output terminal and a cathode is connected between the first condenser and an anode of the first diode, and a second condenser that is inserted between the power supply line and a cathode of the first diode.

According to an embodiment of the present disclosure, when an abnormal charging state occurs, the charging is stopped through the charging control portion, and the charging is reliably stopped through the output of the smoothing circuit even though failure of the charging control portion, run away of the program of the charging control portion, and the like occur. In this way, double protection can be functioned. As well as the charging, double protection can be functioned even with respect to the abnormal discharging state. In addition, circuits other than the charging control portion such as the charging protective IC are not necessary, and there is an advantage in that the configuration is not complicated.

Additional features and advantages are described herein, and will be apparent from the following Detailed Description and the figures.

DETAILED DESCRIPTION

Figure 1:
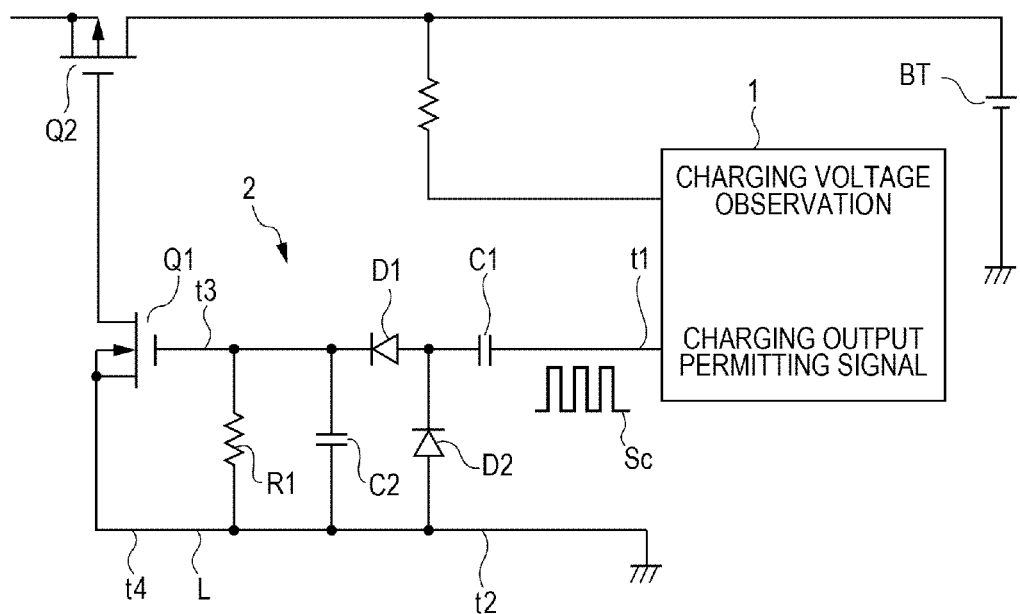
FIG. 1 is connection diagram illustrating an example of a protective circuit.

The present disclosure will be described in detail below with reference to the figures according to an embodiment. In addition, the description is provided according to the following order.
1. Protective Circuit of the Present Disclosure
2. Operation of Protective Circuit
3. Example of Charging Device
4. Another Example of Charging Device
5. Example of Discharging Control Device
6. Modified examples 1. Protective Circuit of the Present Disclosure An example of a protective circuit of the present disclosure is illustrated in FIG. 1. When a P-channel type field effect transistor (hereinafter, appropriately referred to as "FET") Q2 as a charging output control element is turned on, charging power is supplied to a secondary battery BT. The charging control portion 1 observes charging voltage between the FET Q2 and the secondary battery BT via resistance, and compares the charging voltage and a preset threshold value. According to the comparison result, a charging output permitting signal is output from the charging control portion 1. For example, the charging control portion 1 is a microcomputer which includes a CPU (Central Processing Unit), a ROM (Read Only Memory), a RAM (Random Access Memory), or the like.

When the charging voltage is smaller than a threshold value, it is determined to be a normal charging state, and a pulse-like charging output permitting signal Sc is output from the charging control portion 1. The charging output permitting signal is supplied to a smoothing circuit 2, and output of the smoothing circuit 2 is supplied to a gate of an N-channel type FET Q1. Resistance is connected between the gate of the N-channel type FET Q1 and a negative reference potential point. When smoothing output of the smoothing circuit 2 is positive, the N-channel type FET Q1 is turned on. The drain of the FET Q1 is connected to the gate of the FET Q2, and due to the fact that the FET Q1 is turned on, the FET Q2 is turned on. Therefore, charging power is output to the battery BT, and the battery BT is charged.

The smoothing circuit 2 includes a first input terminal t1 and a second input terminal t2 to which the pulse-like charging output permitting signal Sc is input, and a first output terminal t3 and a second output terminal t4 which output the control signal to the gate of the FET Q1. The input terminal t1 is connected to the first output terminal t3 (gate of FET Q1) through a series circuit of a first condenser C1 and a first diode D1 in the forward direction.

In addition, in the smoothing circuit 2, an anode of a second diode D2 is connected to a power supply line L of ground side which connects the second input terminal t2 and the second output terminal t4, and a cathode of the second diode D2 is connected to a connection point of the first condenser C1 and an anode of the first diode D1. Moreover, a second condenser C2 is inserted between the power supply line L and a cathode of the first diode D1. Further, resistance R1 is inserted between the power supply line L and the gate of the FET Q1.

In a normal charging state, the pulse-like charging output permitting signal Sc is smoothened by the smoothing circuit 2, and a positive voltage of an approximate direct current is output to the output terminals t3 and t4 of the smoothing circuit 2. The FET Q1 is turned on by the output of the smoothing circuit 2. The drain of the FET Q1 is connected to the gate of the FET Q2, due to the fact that the FET Q1 is turned on, the FET Q2 is turned on, the charging power is supplied to the battery BT, and the battery BT is charged.

On the other hand, when the charging voltage is the threshold value or more, it is determined to be an abnormal charging state, and the charging control portion 1 does not output the pulse-like charging output permitting signal. Therefore, the output of the smoothing circuit 2 does not become a high level, and the FET Q2 is turned off in the state where the FET Q1 is turned off. As a result, the charging power is not supplied to the battery BT, and the charging output is stopped.

Here, even when the output of the charging control portion 1 is any one of a low level or a high level, the output signal of the smoothing circuit 2 does not become a high level by the direct current input, the FET Q1 is turned off, and the charging output is stopped. That is, even when the charging output permitting signal is fixed to a high level (or a low level) by failure of the charging control portion 1 or run away of the program, the charging output is not permitted, and it is possible to reliably prevent the battery BT from overcharging. Moreover, it is not necessary to install a protective IC separated to the charging control portion 1, and there is an advantage in that the configuration is not complicated.

2. Operation of Protective Circuit

Figure 2A:
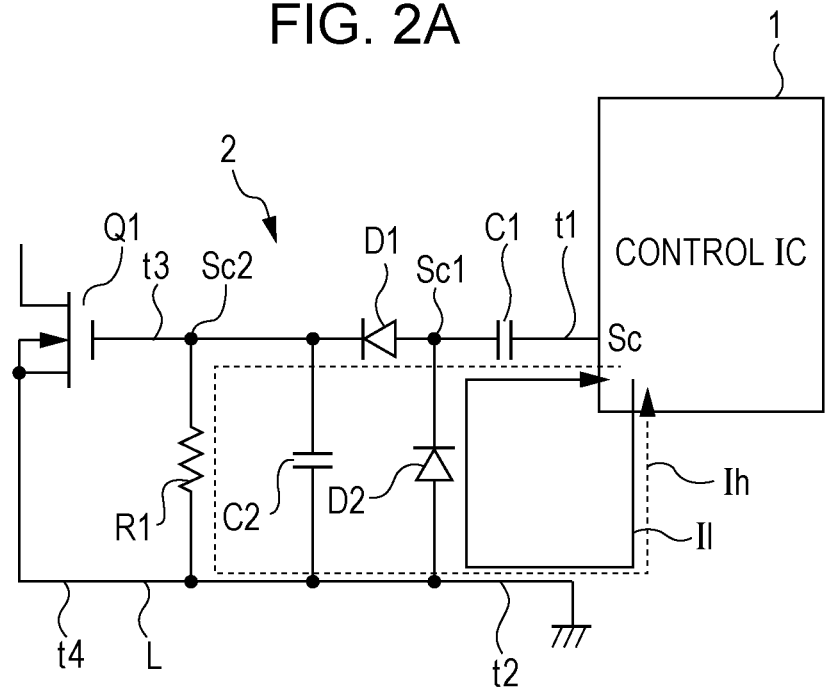
FIGS. 2A and 2B are a connection diagram and a waveform diagram used for explaining operation of the protective circuit.
Figure 2B:
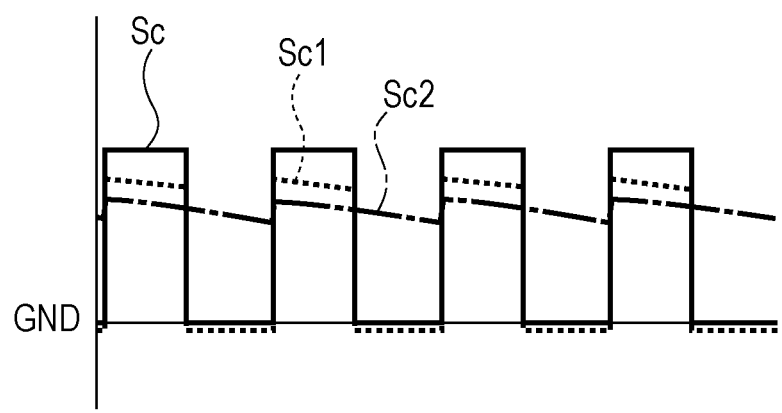

Operation of the protective circuit of an embodiment of the present application will be described in more detail with reference to FIGS. 2A and 2B. FIG. 2A illustrates a current path in the protective circuit, and FIG. 2B illustrates voltage waveforms of each portion. In a period of the high level of the pulse-like charging output permitting signal Sc, current Ih flows through a path which is indicated by a dotted line (the input terminal t1→the condenser C1→the diode D1→the resistance R1→the power supply line L→the input terminal t2). In a period of the low level of the charging output permitting signal Sc, current Il flows through a path indicated by a solid-line (the input terminal t2→the power supply line L→the diode D2→the condenser C1→the input terminal t1).

The waveform of signal voltage Sc1 of the connection point between the condenser C1 and the anode of the diode D1 and the waveform of signal voltage Sc2 with respect to the gate of the FET Q1 are each illustrated in FIG. 2B. The FET Q1 is continuously maintained in an on-state by the signal voltage Sc2. As a result, the gate of the FET Q2 becomes the potential (ground potential GND) of the power supply line L1, the FET Q2 is continuously maintained in an on-state, and the power output is permitted. The diode D1 is turned on at a section of a high level of the charging output permitting signal Sc and smoothes a pulse, and turned off at a section of a low level of thereof and obstructs a counter current. In addition, the section of the low level is clamped to the ground potential GND by the diode D2.

Figure 3A:
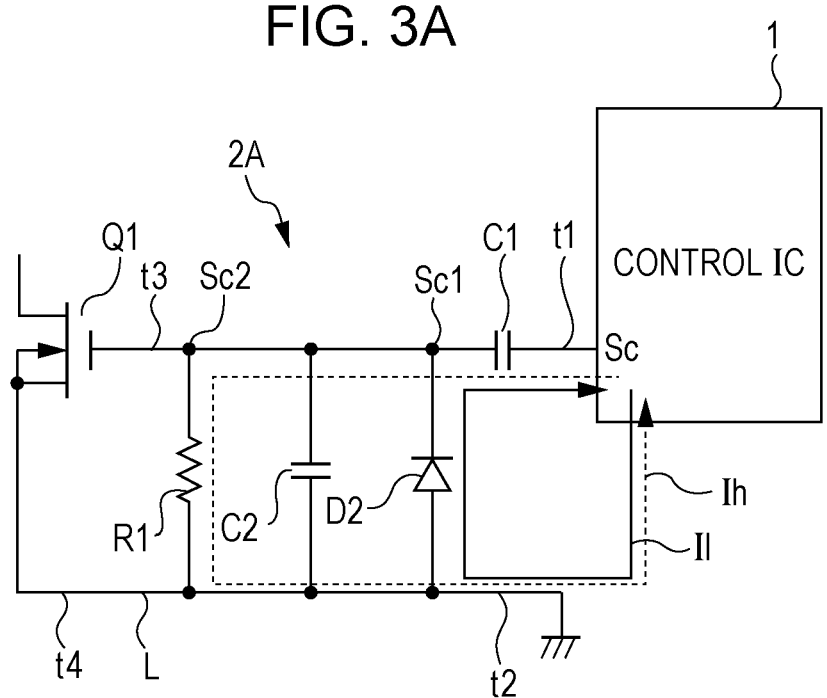
FIGS. 3A and 3B are a connection diagram and a waveform diagram used for reference in the explanation of the protective circuit.
Figure 3B:
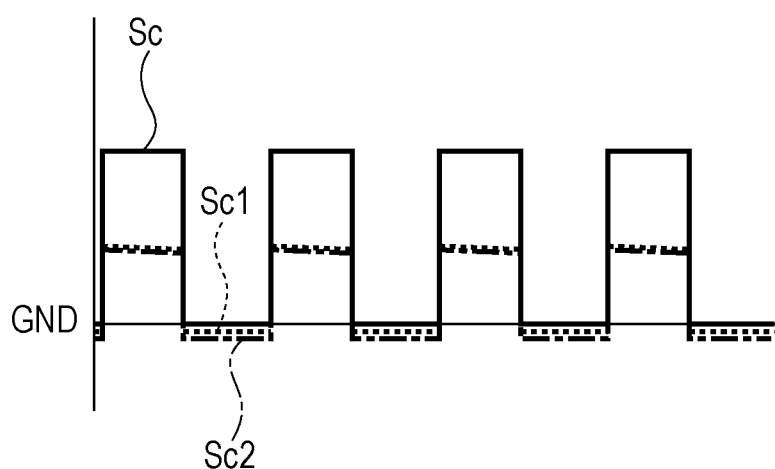

A circuit 2A of FIG. 3A illustrates a configuration in a case where the diode D1 is not connected in the above-described smoothing circuit 2. In the configuration, in the section of the low level of the charging output permitting signal Sc, a counter current (not illustrated) which discharge the condenser C2 also flows in addition to the current Ih, and voltage of the condenser may not be maintained. Therefore, as illustrated in FIG. 3B, the signal voltage Sc2 added to the gate of the FET Q1 becomes a pulse waveform, the FET Q1 and the FET Q2 perform a switching operation, and a normal control may not be performed. Thereby, the diode D1 is necessary.

Figure 4A:
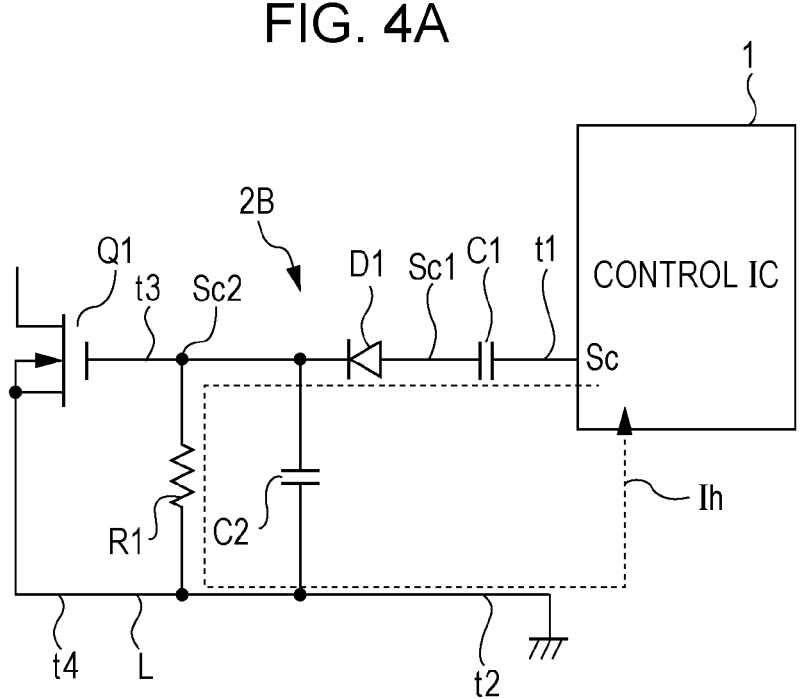
FIGS. 4A and 4B are a connection diagram and a waveform diagram used for reference in the explanation of the protective circuit.
Figure 4B:
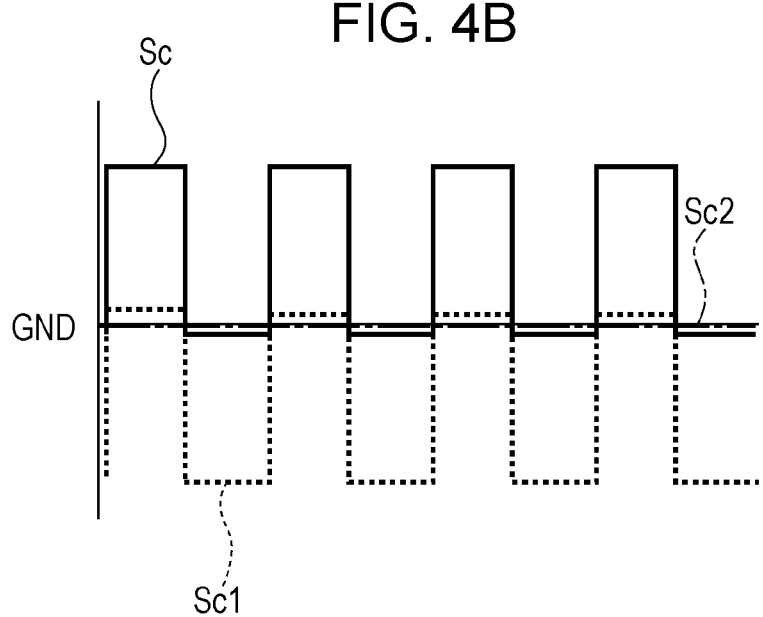

A circuit 2B of FIG. 4A illustrates a configuration in a case where the diode D2 is not connected in the above-described smoothing circuit 2. As illustrated in FIG. 4B, after the charging output permitting signal (pulse signal) Sc passes through the condenser C1, the level of the signal voltage Sc1 has the ground potential GND as a reference. That is, the level becomes (GND+VF) (VF is a voltage drop in forward direction of the diode D1 and about 0.6 V) in the section of the high level, and (GND−Vcc+VF) in the section of the low level. Vcc is the level in the section of the high level of the signal Sc, and for example, is +5 V. Since the gate potential of the FET Q1 becomes the ground level GND, the FET Q1 may not be turned on. Therefore, the diode D2 is necessary.

Figure 5A:
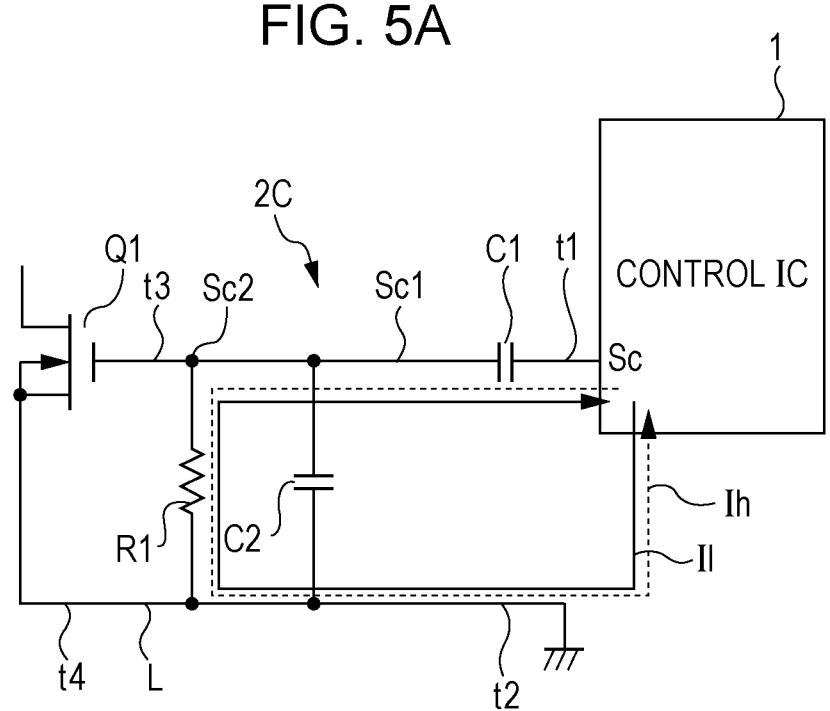
FIGS. 5A and 5B are a connection diagram and a waveform diagram used for reference in the explanation of the protective circuit.
Figure 5B:
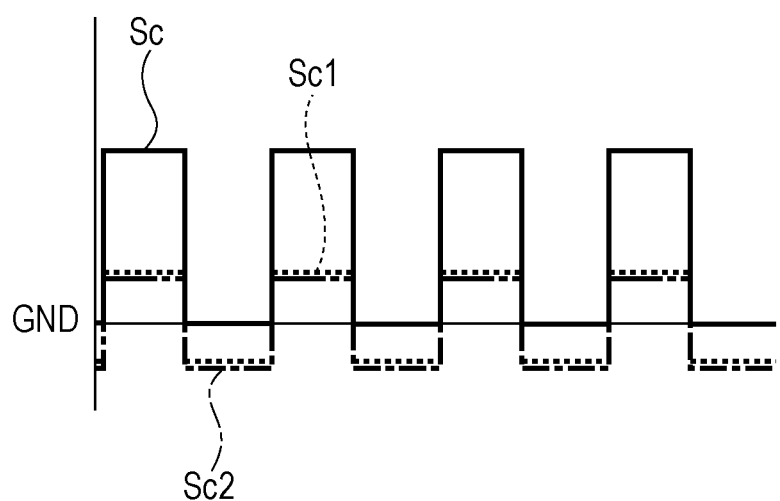

A circuit 2C of FIG. 5A illustrates a configuration in a case where the diode D1 and the diodes D2 are not connected in the above-described smoothing circuit 2. In this case, the waveform of the signal voltage Sc1 passing through the condenser C1 is the same as that of the signal voltage Sc2 which is supplied to the gate of the FET Q1. As illustrated in FIG. 5B, the signal voltages become a pulse waveform which has the ground potential GND as the center point, and the gate voltage of the FET Q1 may not positively be held. Therefore, both the diode D1 and the diode D2 are necessary.

As an example, a pulse signal in which frequency is 100 Hz and duty is 50% is used as the charging output permitting signal Sc. An example of a value of each element in the smoothing circuit 2 in the above case is described as the following. C1 is 0.1 μF, C2 is 0.1 μF, and R1 is 470 kΩ.

3. Example of Charging Device

Figure 6:
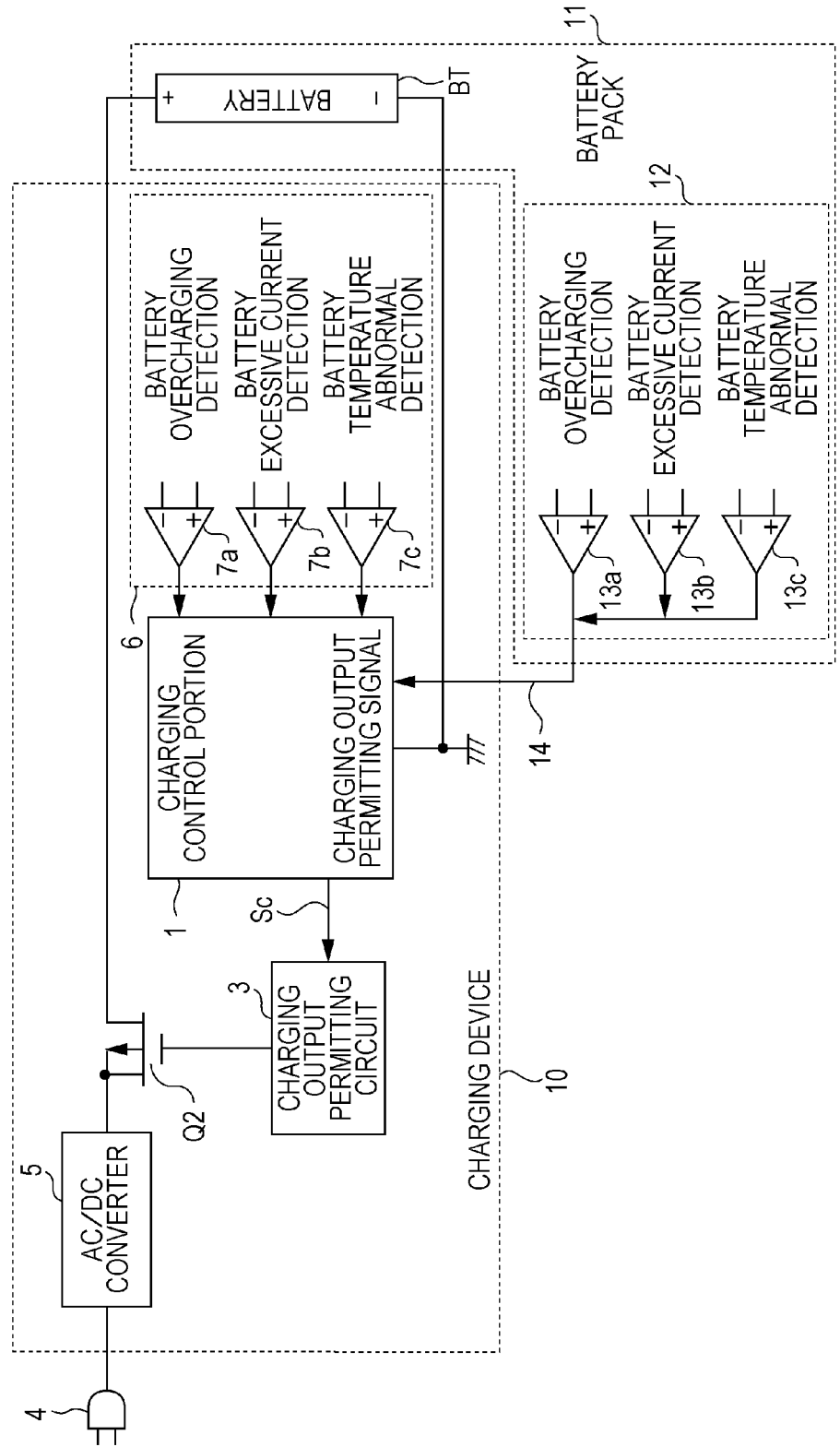
FIG. 6 is a block diagram illustrating an example of a charging device.

An example of the charging device including the above-described protective circuit will be explained with reference to FIG. 6. The charging device 10 rectifies AC (alternating-current) power, which is supplied through an AC plug 4, by an AC/DC converter 5, and generates a charging power. The charging power is output to an output terminal via the FET Q2 which is a charging control element. The FET Q2 is controlled by a control signal from a charging output permitting circuit 3 which is a control signal generating portion. The charging output permitting circuit 3 includes the smoothing circuit 2 and the FET Q1 described above. The pulse-like charging output permitting signal Sc is supplied from the charging control portion 1 to the charging output permitting circuit 3.

A battery pack 11 is connected to the output terminal of the charging device 10. The battery pack 11 includes the secondary battery BT and a charging or discharging control circuit (not illustrated). The battery pack 11 includes a battery for electrical driven tools such as an electric driven saw or an electric driven driver, a small-sized battery which is used in electronic equipment such as a notebook PC, a digital camera, a mobile phone, or a large-sized battery which is used as a charging device in the home, a driving source of a vehicle, and the like. In addition, a configuration in which a plurality of battery cells is connected to each other in series or parallel can be used.

The abnormal charging state in which a charging stopping operation is performed includes at least one of a state where the charging current is greater than a preset value or a state where the temperature of the battery is higher than a preset value as well as a state where the voltage of the charging output is greater than a preset threshold value. An abnormal detection circuit 6 is included in the charging device 10 in order to detect an abnormal charging state.

For example, the abnormal detection circuit 6 includes three comparators 7a, 7b, and 7c. The comparator 7a compares a charging voltage and a threshold value for overcharging protection and supplies a detection signal indicating abnormal charging to the charging control portion 1 if the charging voltage is greater than the threshold value. The comparator 7b compares a charging current and a threshold value for excessive current protection and supplies a detection signal indicating abnormal charging to the charging control portion 1 if the charging current is greater than the threshold value. The comparator 7c compares a battery temperature and a threshold value for heating protection and supplies a detection signal indicating abnormal charging to the charging control portion 1 if the battery temperature is higher than the threshold value. Information of the charging voltage and the charging current can be detected in the charging device 10. The charging device 10 receives information of the battery temperature from a temperature detection element in the battery pack 11.

The charging device 10 may receive information from an abnormal detection circuit 12 installed in the battery pack 11 instead of the abnormal detection circuit 6. Similarly to the abnormal detection circuit 6 in the charging device 10 described above, the abnormal detection circuit 12 includes comparators 13a, 13b, and 13c. The comparators each detect overcharging, excessive current, and abnormal heating. The detection signal from each comparator is sent from the battery pack 11 to the charging control portion 1 of the charging device 10 through a communication path 14. In this case, the output of each comparator may be separately sent, and a logical sum (OR) output of the output of each comparator may be sent as the abnormal charging signal.

4. Another Example of Charging Device

Figure 7:
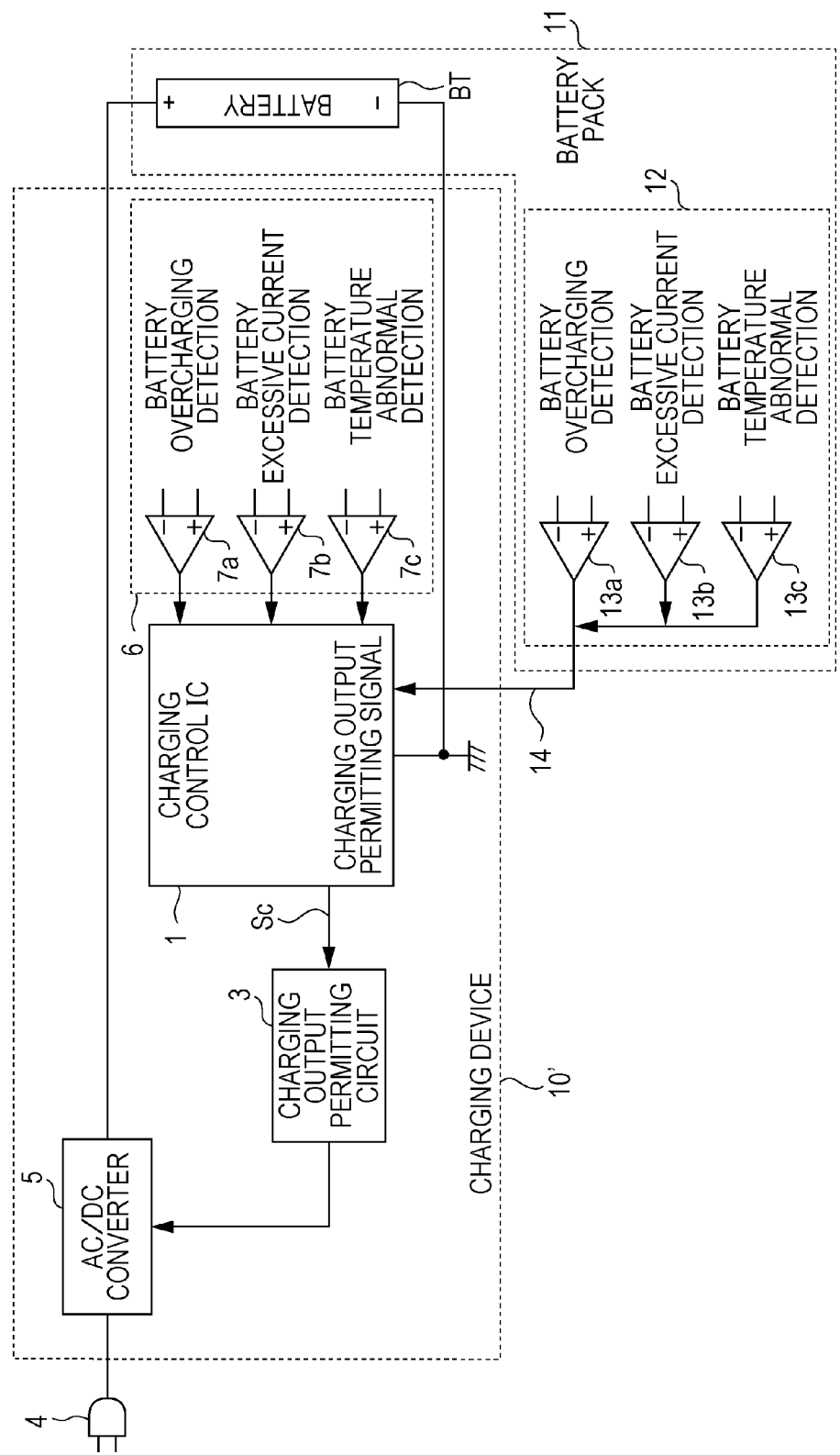
FIG. 7 is a block diagram illustrating other example of the charging device.

In the above explanation, if the abnormal charging state is detected, the permitting or stopping of the charging output is performed according to the turning on or off of the FET Q2. In a charging device 10' illustrated in FIG. 7, the control signal from the charging output permitting circuit 3 is supplied to the AC/DC converter 5 which is the charging power supply generating circuit, and if an abnormal charging state is detected, the power supply generating operation of the AC/DC converter 5 is stopped.

Figure 8:
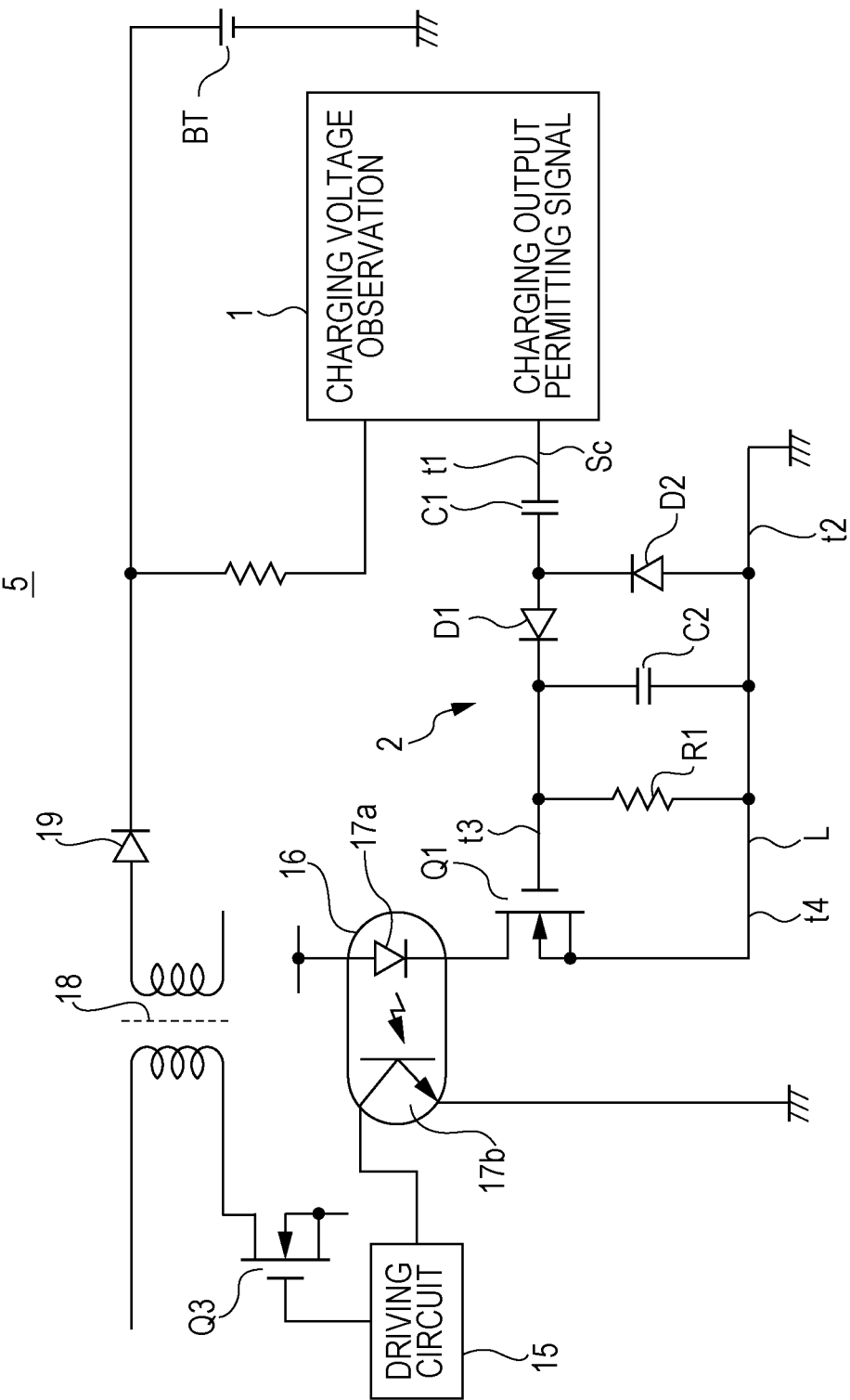
FIG. 8 is a connection diagram illustrating more specific connection of the other example of the charging device.

As illustrated in FIG. 8, in a case where the AC/DC converter 5 is configuration of a switching power supply circuit, a charging permitting signal or a charging stopping signal is supplied to a driving circuit 15 which generates a switching signal driving a switching element FET Q3. The output of the smoothing circuit 2 is supplied to the gate of the FET Q1, and the drain of the FET Q1 is connected to a positive power supply terminal via a light-emitting diode 17a of a photocoupler 16. In a normal charging state, if the FET Q1 is turned on by the output of the smoothing circuit 2, current flows to a light emitting diode 17a and the light emitting diode 17a illuminates. Current flows to a phototransistor 17b of the photocoupler 16, and a control signal generated in a collector of the phototransistor becomes a low level. A driving circuit 15 receives the control signal of the low level and generates a switching signal for switching the FET Q3.

A switching power supply circuit is schematically illustrated in FIG. 8. A first coil of a transistor 18 is connected to the drain of the FET Q3, and a rectifier diode 19 is connected to a second coil of the transistor. As the switching power supply circuit, various configurations such as a step-up type, a step-down type, and a current resonance type can be used. In addition, an AC/DC converter may be used other than the switching power supply circuit.

If an abnormal charging state such as the state where the charging voltage is excessive occurs, the FET Q1 is turned off, and the collector of the phototransistor 17b of the photocoupler 16 from a low level to a high level or is opened. Thereby, the driving circuit 15 stops generation of the switching signal. Therefore, generation of power supply stop and charging voltage is stopped.

5. Example of Discharging Control Device

Figure 9:
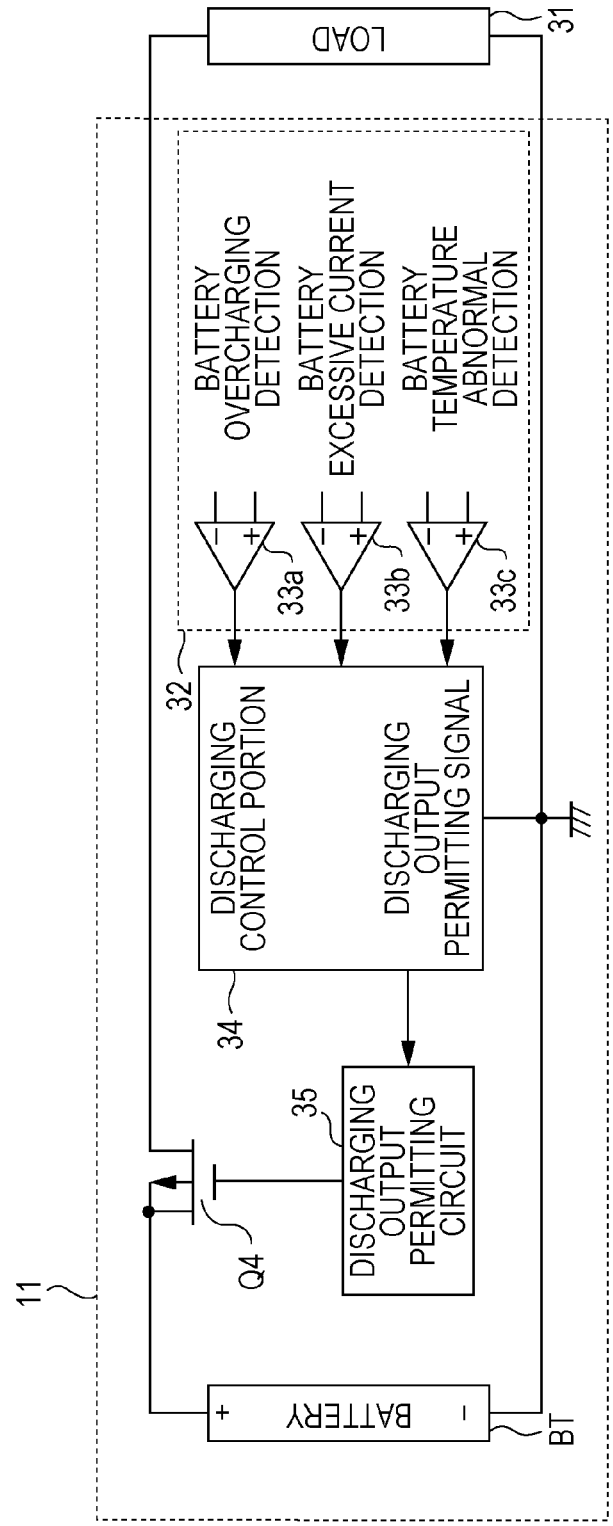
FIG. 9 is a block diagram illustrating a battery pack including a protective function at the time of discharging.
Figure 10:
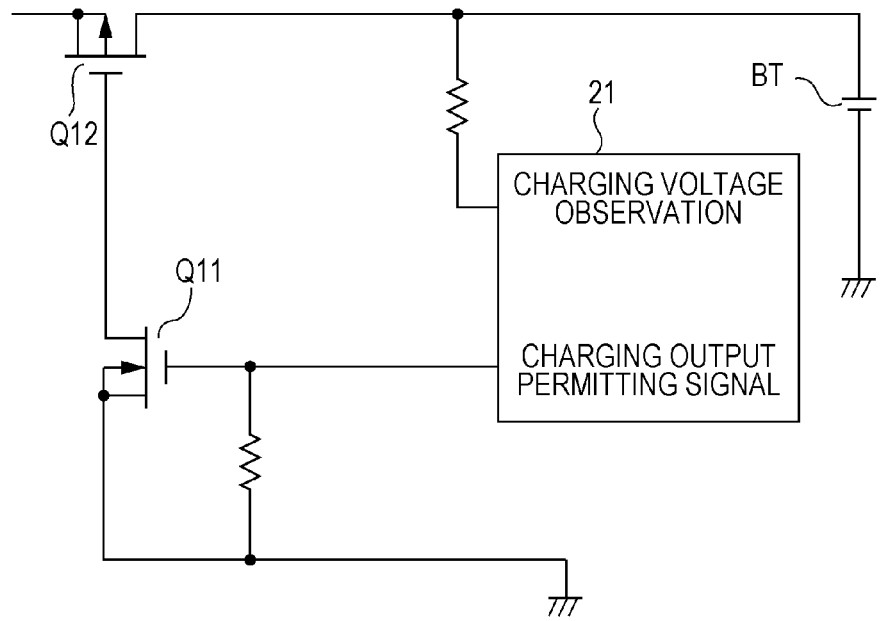
FIG. 10 is a connection diagram illustrating an example of a protective circuit in the related art.
Figure 11:
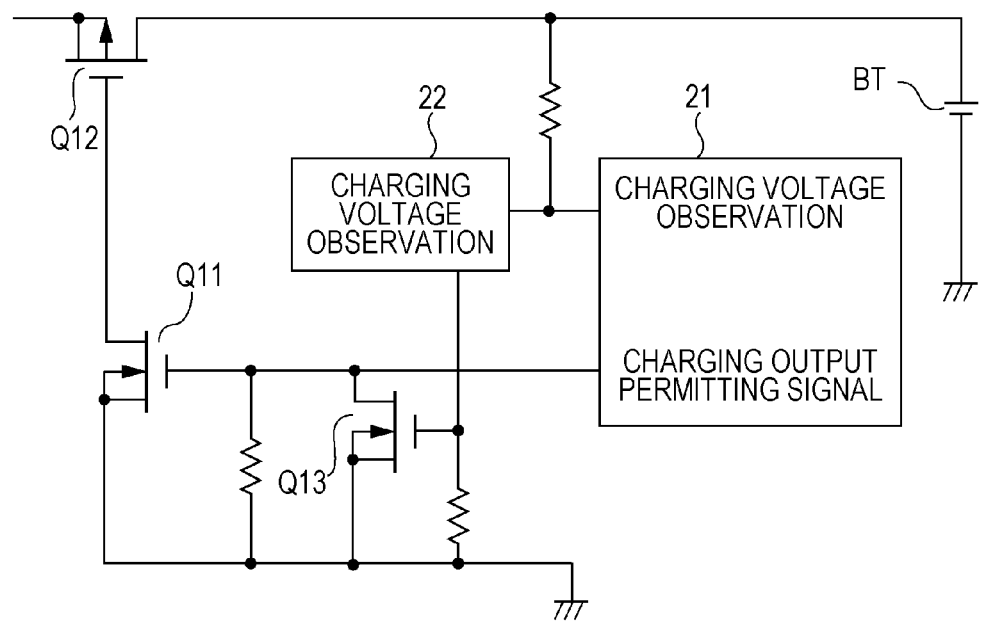
FIG. 11 is a connection diagram illustrating another example of a protective circuit in the related art.

In the above explanation, the charging output of the charging device is controlled. However, embodiments of the present disclosure can be applied even to the discharging control. As illustrated in FIG. 9, a load 31 is connected to the battery pack 11, and discharging current is supplied to the load 31 from the battery BT of the battery pack 11 through a FET Q4.

An abnormal detection circuit 32 for detecting an abnormal discharging state is provided in the battery pack 11. For example, the abnormal detection circuit 32 includes three comparators 33a, 33b, and 33c. The comparator 33a compares a battery voltage and a threshold value for over-discharging protection and supplies a detection signal indicating over-discharging to a discharging control portion 34 if the battery voltage is smaller than the threshold value. The comparator 33b compares a discharging current and a threshold value for excessive current protection and supplies a detection signal indicating excessive current to the discharging control portion 34 if the discharging current is greater than the threshold value. The comparator 33c compares a battery temperature and a threshold value for heating protection and supplies a detection signal indicating abnormal heating to the discharging control portion 34 if the battery temperature is higher than the threshold value.

The abnormal discharging detection signal is supplied from the abnormal detection circuit 32 to the discharging control portion 34. For example, the discharging control portion 34 is a microcomputer including a CPU, a ROM, a RAM, or the like. In a normal discharging state, the discharging control portion 34 generates a pulse-like discharging output permitting signal, and in an abnormal discharging state, a discharging output stopping signal of a fixed direct current level is generated. The discharging output permitting signal (or the discharging output stopping signal) is supplied to the discharging output permitting circuit 35.

The discharging output permitting circuit 35 has a similar configuration to that of the charging output permitting circuit described with reference to FIG. 1. That is, the discharging output permitting circuit includes a smoothing circuit in which a pulse-like discharging output permitting signal is input in a normal discharging state and a pulse-like discharging output permitting signal is not input in an abnormal discharging state. In addition, the discharging output permitting circuit includes the FET Q4 which is controlled so as to permit or stop the discharging output from the battery BT to the load 31, permit the discharging output by the output signal in which the discharging output permitting signal is smoothened by a smoothing circuit, and stops the discharging output when the abnormal discharging state is detected.

The smoothing circuit includes a configuration similar to that of the smoothing circuit 2 illustrated in FIG. 1. That is, the smoothing circuit of the discharging includes the first input terminal and the second input terminal in which the pulse-like discharging output permitting signal is input, and the first output terminal and the second output terminal in which the control signal is output to the discharging output control element. In addition, the series circuit includes the first condenser and the first diode in the forward direction which are inserted between the first input terminal and the first output terminal. Moreover, the anode is connected to the power supply line which connects the second input terminal and the second output terminal, and the smoothing circuit for the discharging includes the second diode in which the cathode is connected between the first condenser and the anode of the first diode, and the second condenser which is inserted between the power supply line and the cathode of the first diode.

In the abnormal discharging state, if the discharging control portion 34 generates the discharging output stopping signal of the fixed direct current level, the discharging output stopping signal is supplied to the discharging output permitting circuit 35. The discharging output permitting circuit 35 generates a control signal which turns off the FET Q4. Therefore, the discharging current path from the battery BT to the load 31 is intercepted, and the discharging is stopped. Therefore, the abnormal discharging state is stopped.

6. Modified Examples

As the above, the embodiments of the present disclosure are specifically described. However, the present disclosure is not limited to the above-described embodiments, and various modified examples can be realized based on the technical idea of the present disclosure. For example, as the switching element, switching elements other than the FET may be used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A protective circuit comprising:
a smoothing circuit that is configured to (i) receive a pulse-like charging output permitting signal in a normal charging state and output a smoothed first signal having a first magnitude and (ii) not receive the pulse-like charging output permitting signal in an abnormal charging state and output a second signal having a second magnitude, the second magnitude being less than the first magnitude; and
a charging output control element that is controlled so as to permit or stop a charging output with respect to an electric storage device, permits the charging output conditioned on receiving the smoothed first signal in which the charging output permitting signal is smoothened by the smoothing circuit, and stops the charging output when an abnormal charging state is detected,
wherein the smoothing circuit includes:
a first input terminal and a second input terminal to which the pulse-like charging output permitting signal is input;
a first output terminal and a second output terminal that output a control signal to the charging output control element;
a series circuit that includes a first condenser and a first diode in forward direction which are inserted between the first input terminal and the first output terminal;
a second diode in which an anode is connected to a power supply line which connects the second input terminal and the second output terminal and a cathode is connected between the first condenser and an anode of the first diode; and
a second condenser that is inserted between the power supply line and a cathode of the first diode.

2. The protective circuit according to claim 1, wherein the control signal includes at least one of the smoothed first signal and the second signal.

3. The protective circuit according to claim 1, wherein the abnormal charging state includes at least one of a state where voltage of the charging output is greater than a preset value, a state where charging current is greater than a preset value, and a state where temperature of the electric storage device is higher than a preset value.

4. The protective circuit according to claim 1, further comprising a resistor including a first electrode connected to the first output terminal and a second electrode connected to the second output terminal.

5. A protective circuit comprising:
a smoothing circuit in which a pulse-like discharging output permitting signal is input in a normal discharging state and the pulse-like discharging output permitting signal is not input in an abnormal discharging state; and
a discharging output control element that is controlled so as to permit or stop a discharging output from an electric storage device to a load, permits the discharging output by an output signal in which the discharging output permitting signal is smoothened by the smoothing circuit, and stops the discharging output when an abnormal discharging state is detected,
wherein the smoothing circuit includes:
a first input terminal and a second input terminal to which the pulse-like discharging output permitting signal is input;
a first output terminal and a second output terminal that output a control signal to the discharging output control element;
a series circuit that includes a first condenser and a first diode in forward direction which are inserted between the first input terminal and the first output terminal;
a second diode in which an anode is connected to a power supply line which connects the second input terminal and the second output terminal and a cathode is connected between the first condenser and an anode of the first diode; and a second condenser that is inserted between the power supply line and a cathode of the first diode.

6. The protective circuit according to claim 5, wherein the smoothing circuit is configured to output a smoothed signal during the normal discharging state and the control signal includes the smoothed signal.

7. The protective circuit according to claim 5, wherein the abnormal discharging state includes at least one of a state where a voltage of the discharging output is smaller than a preset value, a state where a discharging current is greater than a preset value, and a state where a temperature of the electric storage device is higher than a preset value.

8. A charging device comprising:
a power supply circuit that generates a charging power supply;
a charging output control element that controls permitting or stopping of output of the charging power supply;
a charging control portion that detects a charging state, outputs a pulse-like output permitting signal when a charging state is normal, and does not output the output permitting signal when a charging state is abnormal; and
a control signal generating portion that is connected to the charging control portion and outputs a control signal from the output permitting signal to the charging output control element,
wherein the control signal generating portion includes:
a first input terminal and a second input terminal to which the pulse-like output permitting signal is input;
a first output terminal and a second output terminal that output the control signal to the charging output control element;
a series circuit that includes a first condenser and a first diode in forward direction which are inserted between the first input terminal and the first output terminal;
a second diode in which an anode is connected to a power supply line which connects the second input terminal and the second output terminal and a cathode is connected between the first condenser and an anode of the first diode; and
a second condenser that is inserted between the power supply line and a cathode of the first diode.

9. The charging device according to claim 8, wherein the control signal generating portion further includes:
a resistor including a first electrode connected to the first output terminal and a second electrode connected to the second output terminal.

10. The charging device according to claim 8, wherein the abnormal charging state includes at least one of a state where a voltage of the charging output is greater than a preset value, a state where a charging current is greater than a preset value, and a state where a temperature of the electric storage device is higher than a preset value.

11. The charging device according to claim 10, wherein the abnormal charging state is detected in the charging device.

12. The charging device according to claim 10, wherein the abnormal charging state is detected in an electric storage device which is connected to an output.

13. The charging device according to claim 8, wherein the charging output control element is a switching element which is connected to an output side of the power supply circuit, and
the control signal generating portion outputs a control signal which turns on the switching element from the output permitting signal.

14. The charging device according to claim 8, wherein the charging output control element is a switching element which controls operating or non-operating of the power supply circuit, and
the control signal generating portion outputs a control signal which causes the power supply circuit to be set in an operating state through the switching element from the output permitting signal.

* * * * *